(12) United States Patent  
Masuzawa

(10) Patent No.: US 7,623,308 B2  
(45) Date of Patent: Nov. 24, 2009

(54) REAR PROJECTION LENS DEVICE AND MAGNIFICATION ADJUSTING METHOD THEREOF

(75) Inventor: Tomonari Masuzawa, Saitama (JP)

(73) Assignee: Fujinon Corporation, Saitama (JP)

( * ) Notice: Subject to any disclaimer, the term of this patent is extended or adjusted under 35 U.S.C. 154(b) by 920 days.

(21) Appl. No.: 11/063,987

(22) Filed: Feb. 24, 2005

(65) Prior Publication Data

US 2005/0190464 A1 Sep. 1, 2005

(30) Foreign Application Priority Data

Mar. 1, 2004 (JP) .............................. 2004-056582

(51) Int. Cl.
*G02B 7/02* (2006.01)
(52) U.S. Cl. ..................... 359/819; 359/704
(58) Field of Classification Search .............. 359/704, 359/819
See application file for complete search history.

(56) References Cited

U.S. PATENT DOCUMENTS 3,674,343 A * 7/1972 Hasagawa et al. ........... 359/825

FOREIGN PATENT DOCUMENTS

JP 63-6722 1/1988
JP 3450670 7/2003

* cited by examiner

*Primary Examiner*—Joseph Martinez
(74) *Attorney, Agent, or Firm*—Arnold International; Bruce Y. Arnold

(57) ABSTRACT

The rear projection lens device comprises a fixed lens barrel, a first lens barrel having a front lens group, a second lens barrel having a rear lens group, and a rotation stopper. The first lens barrel is helicoid-coupled with the fixed lens barrel, and moves in an optical axial direction by rotating relative to the fixed lens barrel. The second lens barrel is helicoid-coupled with the first lens barrel and moves in the optical axial direction so as to change an interval between the front lens group and the rear lens group when the first lens barrel rotates. The rotation stopper allows the second lens barrel to move in the optical axial direction, but stops the rotation around the optical axis. A zoom adjustment and aberration correction associated with the zoom adjustment are conducted concurrently only by rotating the first lens barrel.

4 Claims, 5 Drawing Sheets

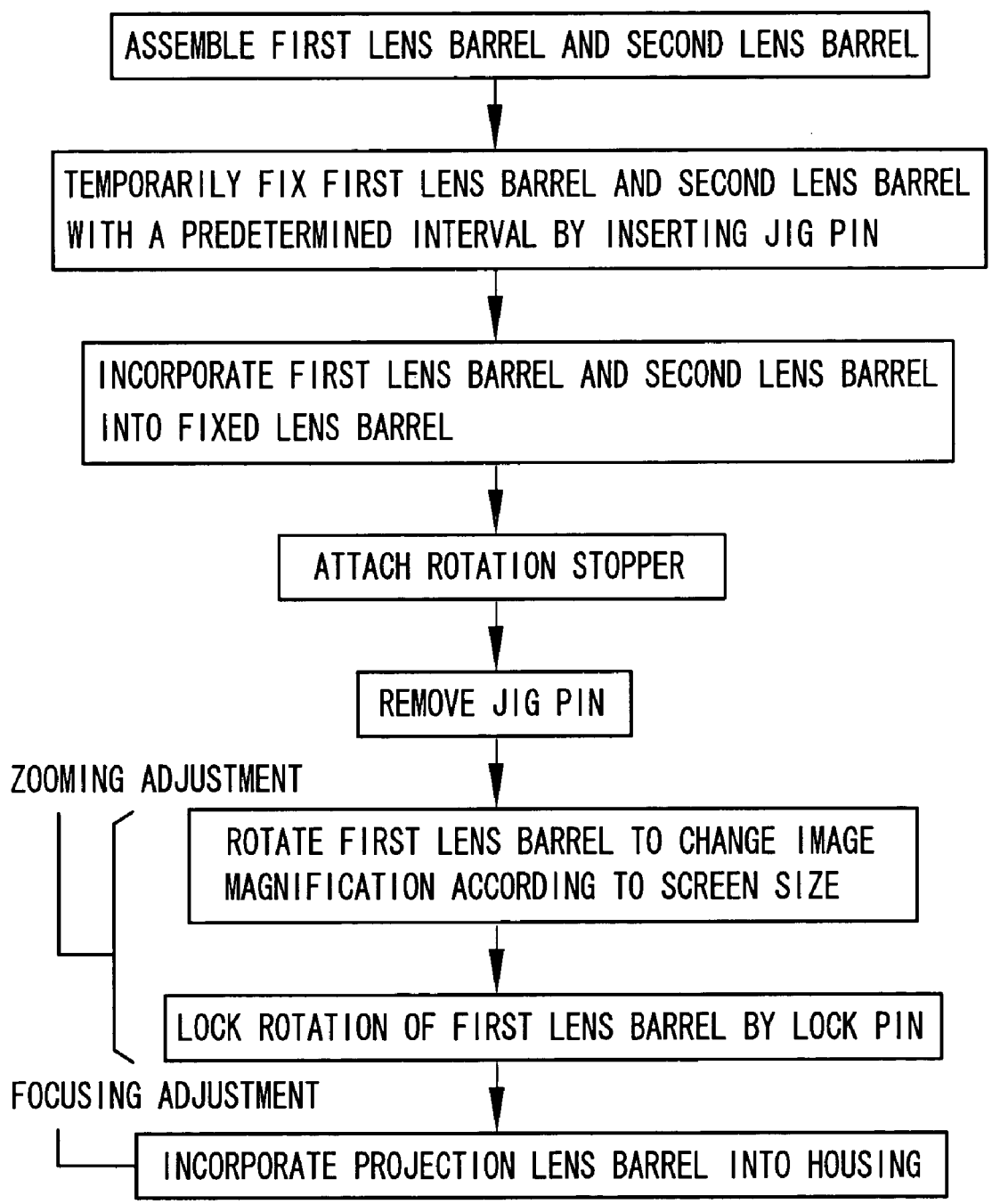

REAR PROJECTION LENS DEVICE AND MAGNIFICATION ADJUSTING METHOD THEREOF

BACKGROUND OF THE INVENTION

1. Field of the Invention

The present invention relates to a rear projection lens device for facilitating a zoom adjustment and a magnification adjustment thereof.

2. Description of the Related Art

In recent years, a large-screen television, which utilizes a rear projector, has become widely used. The rear projector has a translucent screen incorporated in a housing. A plane mirror, which is installed behind the screen, and a projector unit for projecting image light to the plane mirror are accommodated in the housing. The projector unit comprises a projection lens device, an image display panel and an illumination lamp installed in this order from the screen side. The illumination lamp illuminates the image display panel, so that an image displayed on the image display panel is enlarged by the projection lens device to be projected onto the back of the screen. The image formed on the back of the screen is seen from the front side of the screen.

Plural types of the rear projectors are manufactured to the same aspect ratio but different screen sizes. Such rear projectors are different in projection distance between a display surface of the image display panel and the screen, and display field angle (projection angles with respect to the diagonal length of the screen) besides the size of the housing. Therefore, conventionally, the plural types of the projection lens device, which are different in the display field angle, are supplied to deal with the various screen sizes. However, the costs increase when the plural types of projection lens device are manufactured in different specifications. For that reason, it is desired to use a common projection lens device regardless of the screen size.

To achieve commonality of the projection lens device, a zoom adjusting mechanism, which changes the projection angle according to the screen size, becomes necessary. The rear projector has shortened projection distance and significantly enlarged projection magnification to reduce the depth of the projection lens device. For instance, a frame of one square inch is enlarged to the size of the screen (50-60 square inches, for instance). Therefore, recently, a wide-angle aspheric lens is used for the projection lens device.

Usually, when focusing on a subject in a short distance, a lens system is moved near the subject. In this case, however, a sharp image cannot be attained due to aberration variations, especially spherical aberration, which is caused by curvature of field of the lens system. For that reason, the projection lens device requires a floating mechanism for correcting such aberrations. It is also desirable to provide the floating mechanism to the rear projection lens device with a zoom adjustment mechanism, since the aberration correction becomes necessary when the lens system is moved close to the screen for the zoom adjustment.

Japanese Utility Model publication No. 63-6722 and Japanese Patent No. 3450670 respectively disclose a floating lens device with the floating mechanism. The floating lens device has a front lens group and a rear lens group. The floating lens device has a structure that the front lens group is moved forward in accordance with a range ring (a rotation ring), which is operated when focusing on a near-distance subject, and the aberration is corrected by moving the rear lens group relative to the front lens group in response to the movement of the front lens group.

However, the floating lens devices disclosed in the Japanese Utility Model Publication No. 63-6722 and Japanese Patent No. 3450670 are for cameras, so the structure of the lens device including the floating mechanism is complicated under constraints: the floating mechanism is activated at focusing, the range ring is rotated in a fixed position, and a lens barrel cannot be long. On the contrary, parts, such as the range ring, are not necessary for the projection lens device, since there is no need of readjusting zoom and focal positions once they are determined. The rear projection lens device would become expensive if the conventional floating mechanism is incorporated; therefore, the projection lens device with the floating lens mechanism is not yet in the actual use.

SUMMARY OF THE INVENTION

In view of the foregoing, an object of the present invention is to provide a rear projection lens device with a floating mechanism at a low cost.

Another object of the present invention is to provide a rear projection lens device, which enables a zoom adjustment, and the magnification adjusting method thereof.

In order to achieve the above and other objects, the projection lens device of the present invention is provided with a first moving mechanism for moving a first lens barrel, which retains a front lens group, in an optical axial direction by rotating a first lens barrel with respect to a fixed lens barrel, and a second moving mechanism for moving a second lens barrel, which retains a rear lens group, in the optical axial direction in such a way that an interval between the front lens group and the rear lens group is changed in accordance with the rotation of the first lens barrel.

The first moving mechanism includes a first female helicoid disposed on an inner circumference of a fixed lens barrel and a first male helicoid, which engages the first female helicoid, disposed on an outer circumference of the first lens barrel. The first moving mechanism moves the front lens group in the optical axial direction when the first lens barrel is rotated with respect to the fixed lens barrel. The second moving mechanism includes a second female helicoid, which has a different lead from the first male helicoid and the first female helicoid have, disposed on an inner circumference of the first lens barrel and a second male helicoid, which is disposed on an outer circumference of the second lens barrel and engages the second female helicoid. The second moving mechanism moves the rear lens group in the optical axial direction by relatively rotating the second lens barrel with respect to the first lens barrel. Further, it is desirable to provide a stopper mechanism which allows the second lens barrel to linearly move in the optical axial direction while stopping the rotation of the second lens barrel.

It is preferable to fasten one end of the stopper mechanism to the fixed lens barrel, and that the other end of the stopper mechanism is engaged in a linear groove or a slot formed in the second lens barrel. Further, it is preferable to provide a locking means for locking the rotation of the first lens barrel to keep a focal distance after the first lens barrel is rotated and adjusted to a position for obtaining a proper field angle according to the screen size.

In a zoom adjusting method of the rear projection lens device, the first lens barrel and the second lens barrel are assembled first, and the first lens barrel and the second lens barrel are temporarily secured while keeping a predetermined interval by using a temporary securing means. In this state, the first lens barrel and the second lens barrel are incorporated in the fixed lens barrel, and a stopper mechanism is fastened. The temporary securing means is removed and the magnification of image is changed for properly according to the screen size by rotating the first lens barrel. Thereafter, the rotation of the first lens barrel is locked by the locking means.

According to the present invention, the rear projection lens device has the zoom adjusting mechanism for changing the image magnification by moving the front lens group and the floating mechanism for moving the rear lens group in the optical axial direction in accordance with a zoom position of the front lens group, so that the aberration associated with the zooming is corrected. Therefore, it becomes possible to improve the quality of the projection image even with a common rear projection lens device to the various screen sizes. Further, the zooming and the aberration correction, which is associated with the zooming, can be conducted only by rotating the first lens barrel, so the adjustment operations can be easy.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 5 is a flow chart showing steps of assembling and adjusting a projection lens device.

DETAILED DESCRIPTION OF THE PREFERRED EMBODIMENT(S)

Figure 1:
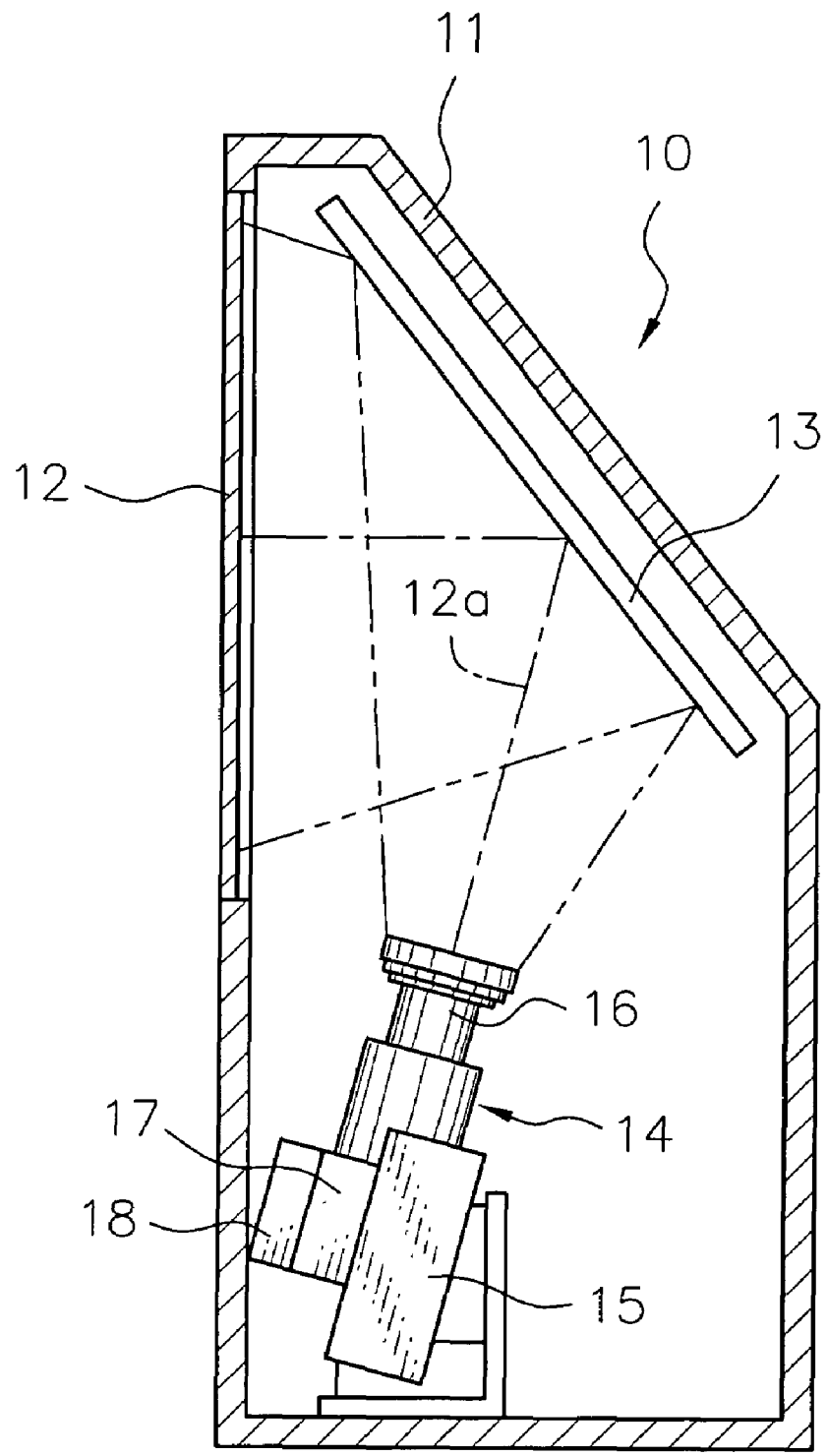
FIG. 1 is a section view of a rear projector.

In FIG. 1, a rear projector 10 comprises a housing 11 with an approximate trapezoidal cross-section, and a translucent screen 12 provided on the front of the housing 11. Inside the housing 11, a plane mirror 13, and a projector unit 14 are accommodated. The projector unit 14 is disposed in a lower portion of the housing 11 in a state that the projector unit 14 is fastened to a support 15, and projects image light according to the externally inputted image signals. The plane mirror 13 is tilted and disposed in an upper portion of the housing, and reflects the image light projected from the projector unit 14 toward the screen 12. An image formed on the screen 12 is observed from a front side of the screen 12.

The projector unit 14 comprises a projection lens device 16, a unit body 17, and a lamp housing 18. The projection lens device 16 has a projection lens equipped with a zoom adjusting mechanism and a floating mechanism. A mounting surface of the support 15 is disposed parallel to a centerline 12a which passes through the center of the screen 12. Therefore, the projector unit 14 is fastened to the support 15 after the projection lens device 16 alone is slightly moved along the centerline 12a to adjust focus according to the magnification of image. The image display panel is incorporated in the unit body 17, and an illumination lamp is incorporated in the lamp housing 18.

There are plural types of the rear projector 10, which have the same aspect ratio of the image but different screen sizes (diagonal length). Each type of the rear projector 10 has different projection distance, which is from a display surface of the image display panel to the screen 12, according to the size of the screen 12. Therefore, in order to use the same projector unit 14, the projection lens device 16 is equipped with the zoom adjusting mechanism which changes the magnification of image according to the size of the screen 12.

Further, in order to form a low-profile housing 11, the projection lens device 16 adopts an aspheric lens for a part of the projection lens, which extremely reduces the projection distance. Therefore, in order to perform such a close-up projection, the projection lens device 16 has the floating mechanism for correcting aberration associated with the zooming.

Figure 2:
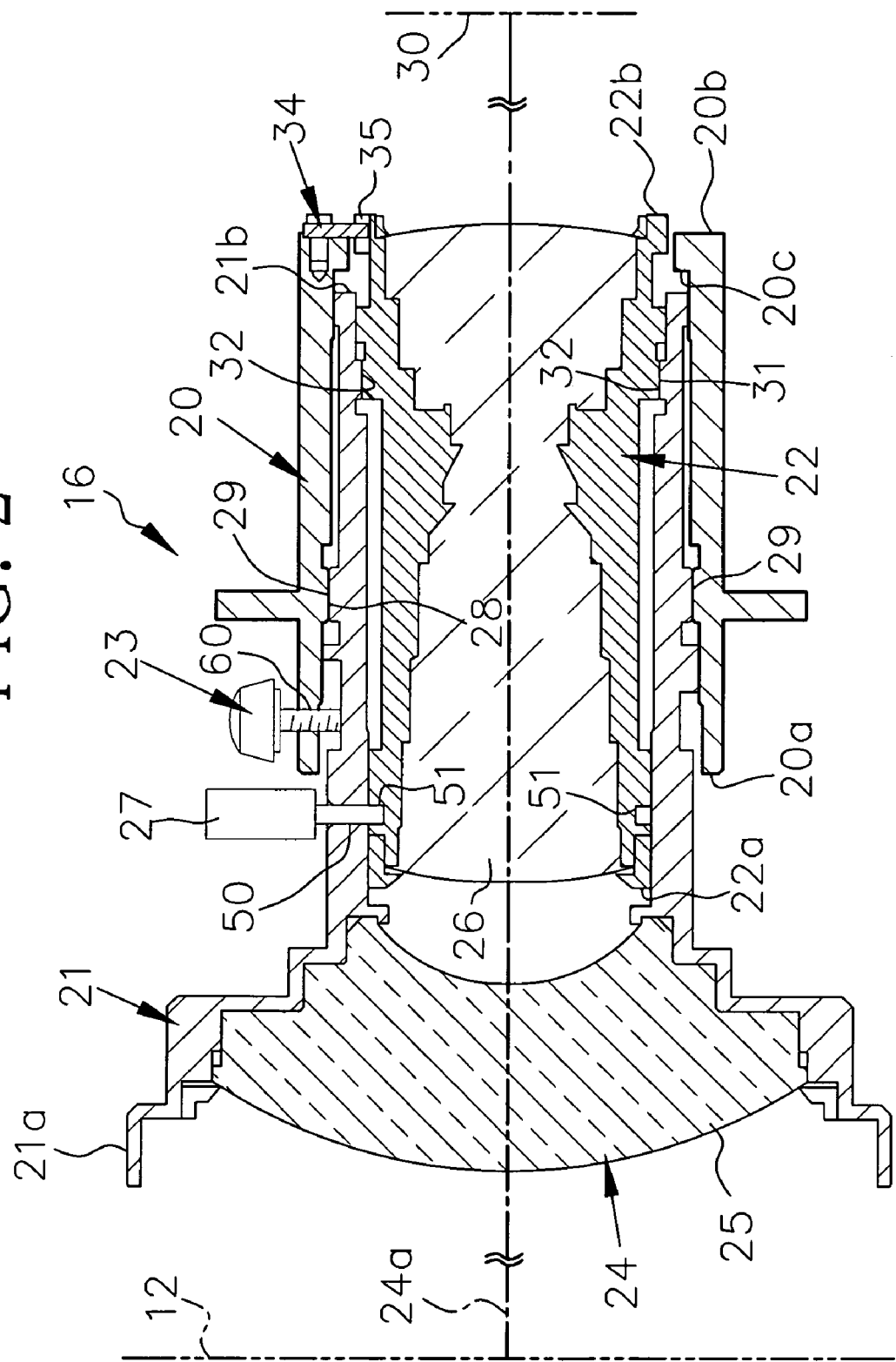
FIG. 2 is an end view of a projector unit.

In FIG. 2, the projection lens device 16 is constituted of a fixed lens barrel 20, a first lens barrel 21, a second lens barrel 22, a lock screw 23, and a projection lens 24. The projection lens 24 includes a front lens group 25 and a rear lens group 26. The aspheric lens is used for a part of the front lens group 25. A numeral 27 designates a jig pin which is only used when incorporating the first lens barrel 21 and the second lens barrel 22 in the fixed lens barrel 20 with a predetermined interval between the front lens group 25 and the rear lens group 26. The jig pin 27 is removed at the time of the zoom adjustment.

The first lens barrel 21 is longer than the fixed lens barrel 20 in an optical axial direction, and a front end 21a of the first lens barrel 21 protrudes toward the screen 12 from the front end 20a of the fixed lens barrel 20. The front end 21a has a larger diameter than the fixed lens barrel 20, and the front lens group 25 is secured inside the first lens barrel 21. A rear end 21b of the first lens barrel 21 contacts a step surface 20c formed inside the fixed lens barrel 20 near a rear end 20b, so as to prevent the first lens barrel 21 from slipping toward a display surface 30 from the rear end 20b of the fixed lens barrel 20. A male helicoid 29, which engages a female helicoid 28 formed on an inner circumference of the fixed lens barrel 20, is formed on an outer circumference of the first lens barrel 21. The first lens barrel 21 moves the front lens group 25 toward an optical axis 24a along a lead of the helicoids 28 and 29 by rotating around the optical axis 24a with respect to the fixed lens barrel 20. Thereby the image magnification of the projection lens 24 is changed.

A rear lens group 26 is secured to the second lens barrel 22. A front end 22a of the second lens barrel 22 fits in a rear portion of the front lens group 25 inside the first lens barrel 21, and a rear end 22b of the second lens barrel 22 protrudes from the rear end 21b of the first lens barrel 21 toward the back. A male helicoid 32, which engages a female helicoid 31 formed on an inner circumference of the first lens barrel 21, is formed on an outer circumference of the second lens barrel 22. A lead of the helicoids 31 and 32 are different from that of the helicoids 28 and 29. To be more specific, a lead angle of the helicoids 31 and 32 for the rear lens group with respect to rotation angle of the first lens barrel 21 is smaller than that of the helicoids 28 and 29 for the front lens group. The relative rotation of the second lens barrel 22 to the first lens barrel 21 will move the rear lens group 26 in the direction of the optical axis 24a according to the lead of the helicoids 31 and 32 so as to change the interval between the front lens group 25 and the rear lens group 26. Thereby, the aberration, which is caused by the movement of the front lens group 25 toward the zoom position, is corrected. The optical axis 24a corresponds to the centerline 12a of the screen 12.

Figure 3:
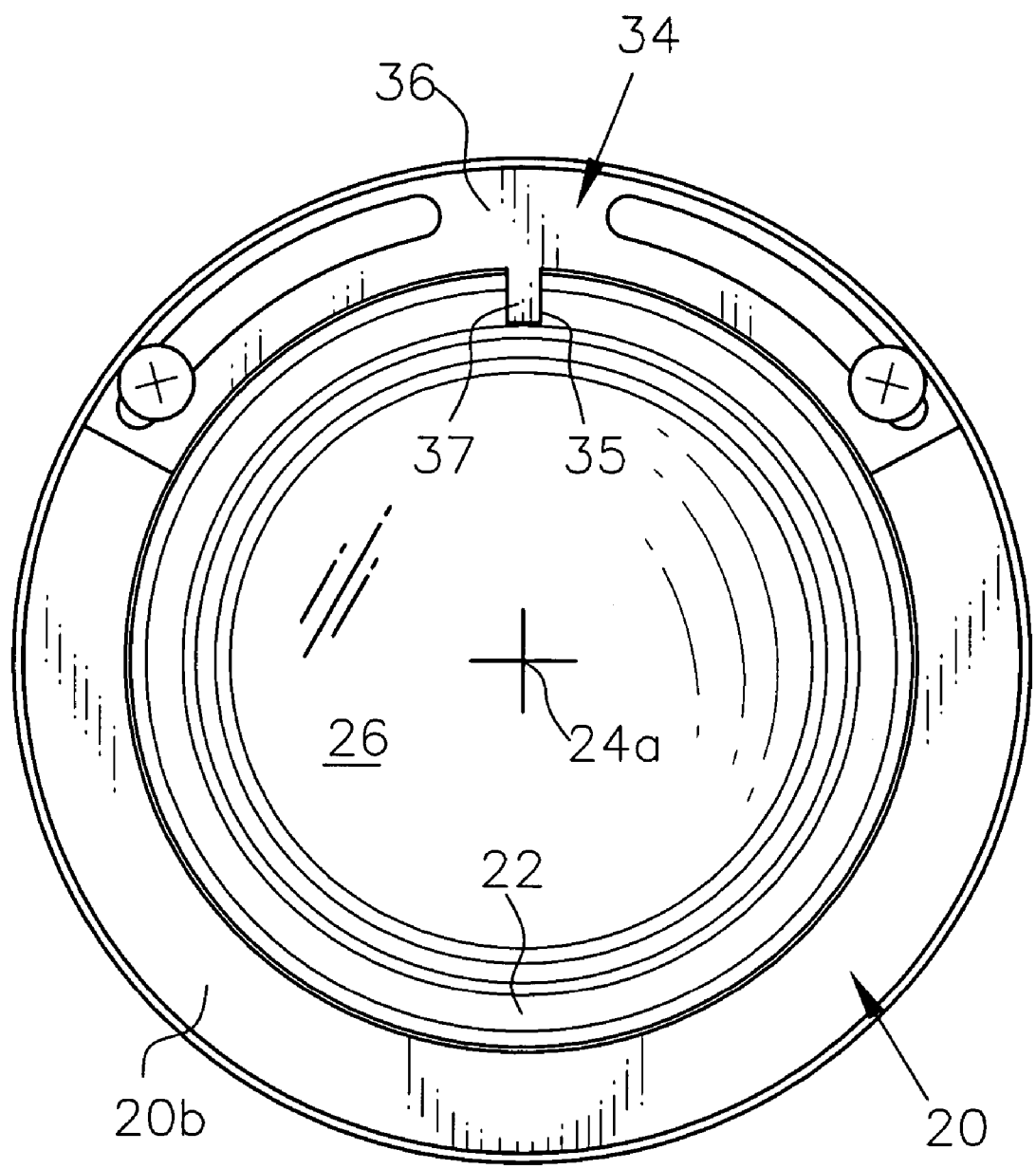
FIG. 3 is an explanatory view showing a rotation stopper member, viewed from a rear end of a fixed lens barrel.

The respective rear ends 20b and 22b of the fixed lens barrel 20 and the second lens barrel 22 extend posterior to the first lens barrel 21. A rotation stopper member 34 is fastened to the rear end 20b of the fixed lens barrel 20. Further, a linear groove 35, which is parallel to the optical axis 24a, is formed in the rear end 22b of the second lens barrel 22. The rotation stopper member 34, as shown in FIG. 3, has a circular arc plate 36 and a guide projection 37 which protrudes radially from the circular arc plate 36. The circular plate 36 is overlaid and fastened to the rear end 20b of the fixed lens barrel 20 with screws. The guide projection 37 engages in the linear groove 35 so as to allow the second lens barrel 22 to linearly move in the optical axial direction 24a but hold the rotation of the second lens barrel 22. It is also possible to form a slot instead of the linear groove 35.

Thus, the image magnification of the projection lens 24 can be changed only by rotating the first lens barrel 21 at the time of the zoom adjustment, since the rotation of the first lens barrel 21 leads to move the front lens group 25 along the direction of the optical axis 24a with respect to the fixed lens barrel 20. Further, as the rotation of the second lens barrel 22 is stopped by the rotation stopper member 34, the second lens barrel 22 linearly moves in the direction of the optical axis 24a according the lead of the helicoids 31 and 32 for the rear lens group by rotating the first lens barrel 21. Thereby, the interval between the front lens group 25 and the rear lens group 26 is changed and the aberration on the image magnification is corrected.

Figure 4:
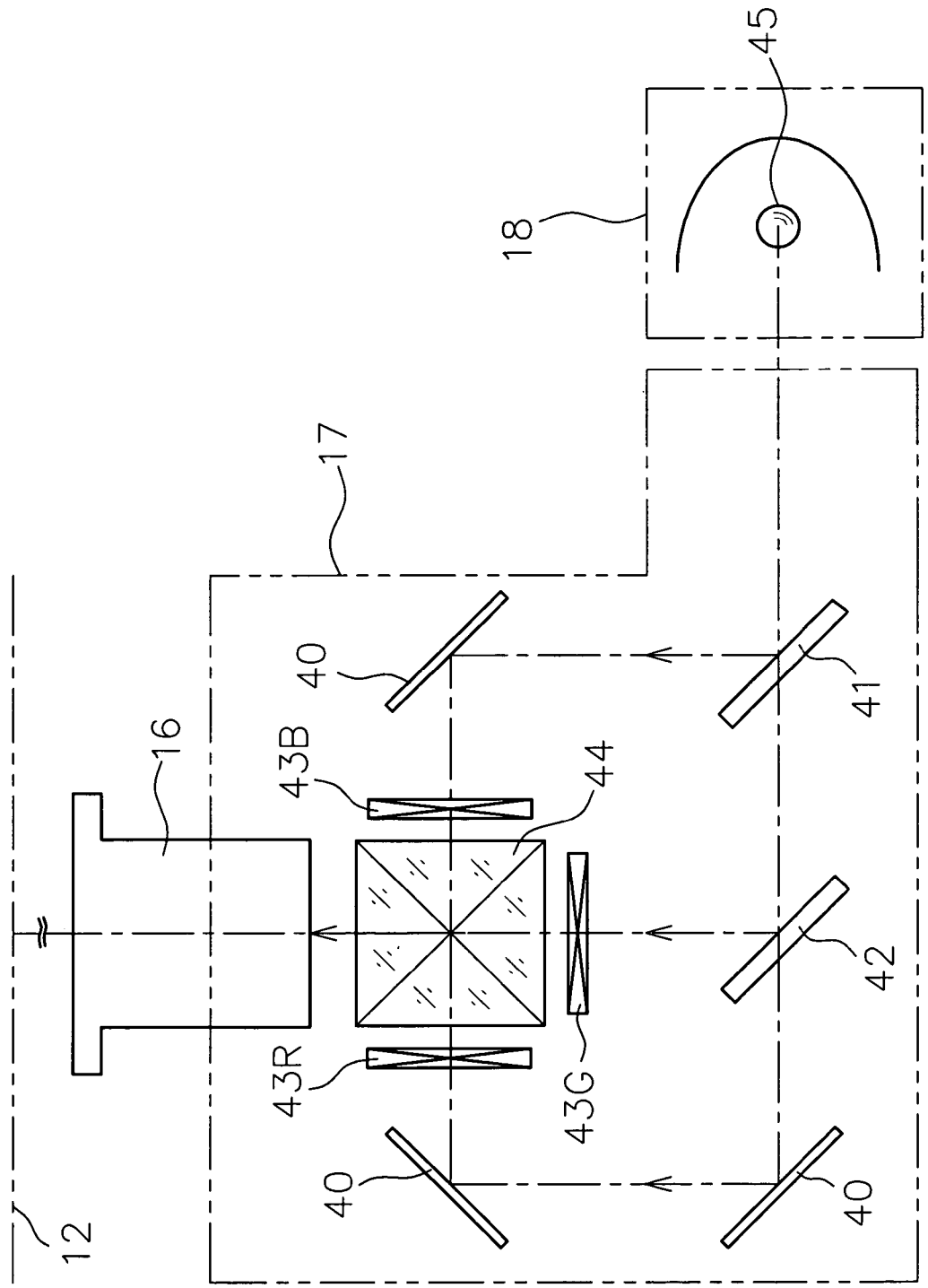
FIG. 4 is an explanatory view showing a unit body.

In FIG. 4, the unit body 17 has plural total reflection mirrors 40, two dichroic mirrors 41 and 42, three translucent LCD panels 43R, 43G and 43B, and a cross dichroic prism 44. White light emitted from an illumination lamp 45 enters the dichroic mirror 41.

The dichroic mirror 41 reflects blue light included in the white light while passing red light and green light so as to separate the blue light from the white light. The separated blue light enters the LCD panel 43B. The red light and the green light, which have passed through the dichroic mirror 41, enter the dichroic mirror 42. The dichroic mirror 42 transmits the red light and reflects the green light so that the red light and the green light are separated. The red light and the green light enter the LCD panels 43R and 43G respectively.

The red light, the green light and the blue light take on image information when passing through the LCD panels 43R, 43G and 43B respectively. Each light ray, which has passed through the corresponding LCD panel 43R, 43G and 43B, enters the cross dichroic prism 44. In the cross dichroic prism 44, the light rays of three colors, which carry the image information, are composited. The composite light enters the projection lens device 16. The projection lens device 19 magnifies and projects the incident composite light, and forms a color image on the screen 12. The display surface 30 (see FIG. 2) corresponds to the LCD panels 43R, 43G and 43B respectively.

Next, an assembly process of the projection lens device 16 is briefly described while referring to FIGS. 2 and 5. In a first process, the second lens barrel 22 is inserted from the rear end side of the first lens barrel 21, and the first lens barrel 21 and the second lens barrel 22 are relatively rotated to be threadably mounted on the helicoids 31 and 32. A positioning hole 50 is formed in the outer circumference of the first lens barrel 21. A groove 51 is formed around the outer circumference of the second lens barrel 22. The hole 50 and the groove 51 are overlaid when the front lens group 25 and the rear lens group 26 reach a reference position where the first lens barrel 21 and the second lens barrel 22 are placed at a predetermined interval. When the hole 50 and the groove 51 are overlaid, the first lens barrel 21 and the second lens barrel 22 are temporarily secured by the jig pin 27 to be inserted in the hole 50 and the groove 51.

In a second assembly process, the first lens barrel 21 and the second lens barrel 22, which are temporarily secured with the jig pin 27, are inserted in the fixed lens barrel 20, and threadably mounted on the helicoids 28 and 29. Then, the first lens barrel 21 and the second lens barrel 22 are moved to an assembly reference position, an extreme rear position where the rear end 21b of the first lens barrel 21 contacts the step surface 20c disposed inside the fixed lens barrel 20, for instance, with respect to the fixed lens barrel 20. Thereafter, the assembly of the projection lens device 16 is completed by fastening the rotation stopper member 34 to the fixed lens barrel 20.

An adjustment process is conducted after the assembly process. The adjustment process includes the zoom adjustment and the focus adjustment. The zoom adjustment is conducted by adjusting the projection lens device 16, and the focus adjustment is conducted when the projection lens device 16 is incorporated in the housing 11.

In the zoom adjustment process, the jig pin 27 is removed first. Next, the first lens barrel 21 is rotated to move the front lens group 25 in the direction of the optical axis 24a to a position where the front lens group 25 achieves the proper image magnification according to the size of the screen 12. The interval between the front lens group 25 and the rear lens group 26 is changed only by rotating the first lens barrel 21, since the second lens barrel 22 is also moved with the rotation of the first lens barrel 21. Thus, it is convenient that the zoom adjustment and the aberration correction associated with the zoom adjustment are conducted concurrently.

After the zoom adjustment, the lock screw 23 is screwed into a screw hole 60 in the fixed lens barrel 20 to hold the first lens barrel 21 by an end of the lock screw 23. Thereby, the rotation of the first lens barrel 21 is stopped with respect to the fixed lens barrel 20. As the rotation of the first lens barrel 21 is stopped, the rotation of the second lens barrel 22 is also stopped. By such configuration, each position of the fixed lens barrel 20, the first lens barrel 21 and the second lens barrel 22 is not changed during transportation, needed in such a case that an incorporating process for incorporating the projection lens device 16 in the housing 11 and the zoom adjustment process are conducted at distant sites.

In the incorporating process, the fixed lens barrel 20 of the projection lens device 16 is mounted to the support 15 in the housing 11. At that time, the focus is adjusted by moving the fixed lens barrel 20 in a direction of the centerline 12a with respect to the support 15, that is, integrally moving the projection lens 24, constituted of the front lens group 25 and the rear lens group 26 without changing the interval between the front lens group 25 and the rear lens group 26. The incorporating process is completed by fastening the projection lens device 16 to the support 15 after adjusting the focus. By conducting the above adjustments, the common projection lens device 16 can be used for the plural types of the rear projector 10 with the different sizes of the screen 12.

In the above embodiment, a three-plate projector with three translucent LCD panels 43R-43B is described. However, it is also possible to apply the present invention to a rear projection device provided with other image display device, such as a reflective LCD panel or a digital micro mirror device. It is also possible to dispose a plurality of plane mirrors in a zigzag pattern to obtain a long projection distance.

Further, the stopper mechanism is not limited to a combination of the guide projection 37 formed in the circular plate 36 and the linear groove 35 as described in FIG. 3. It is also possible to use a combination of an L-shaped guide segment and the linear groove 35. Further, the rotation stopper member 34 can be fastened to other sections besides the rear end 20b of the fixed lens barrel 20 when a recess or a notch is formed in the outer circumference of the first lens barrel 21.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A rear projection device for projecting image light to a screen from behind said screen, said rear projection device comprising:
   (a) a front lens group;
   (b) a rear lens group disposed behind said front lens group;
   (c) a first lens barrel for retaining said front lens group;
   (d) a second lens barrel for retaining said rear lens group;
   (e) a third lens barrel for rotatably accommodating said second lens barrel, said third lens barrel not being rotated;
   (f) a first moving mechanism for moving said front lens group in an optical axial direction when said first lens barrel being rotated, said first moving mechanism including a first female helicoid disposed on an inner circumference of said third lens barrel and a first male helicoid disposed on an outer circumference of said first lens barrel to engage with said first female helicoid;
   (g) a second moving mechanism for moving said rear lens group in said optical axial direction when said first lens barrel being rotated, said second moving mechanism including a second female helicoid disposed on an inner circumference of said first lens barrel and a second male helicoid disposed on an outer circumference of said second lens barrel to engage with said second female helicoid; and
   (h) a rotation stopper mechanism for linearly moving said second lens barrel in said optical axial direction without rotating said second lens barrel when said first lens barrel being rotated.

2. A rear projection device as claimed in claim 1, said rear projection device further comprising:
   (i) a locking member for locking rotation of said first lens barrel after said rotation of said first lens barrel for a zoom adjustment.

3. A rear projection device as claimed in claim 1, wherein said rotation stopper mechanism including:
   a projection fastened to said third lens barrel; and
   a linear groove or a linear slot formed in said second lens barrel, said projection being inserted in said linear groove or said linear slot.

4. A rear projection device as claimed in claim 1, wherein a lead of said first male helicoid and said first female helicoid is different from a lead of said second male helicoid and said second female helicoid.

* * * * *